US007016204B2

(12) United States Patent
Yang et al.

(10) Patent No.: US 7,016,204 B2
(45) Date of Patent: Mar. 21, 2006

(54) CLOSE-LOOP PWM CONTROLLER FOR PRIMARY-SIDE CONTROLLED POWER CONVERTERS

(75) Inventors: Ta-yung Yang, Milpitas, CA (US); Guo-Kiang Hung, Sindian (TW); Jenn-yu G. Lin, Taipei (TW)

(73) Assignee: System General Corp., Taipei Hsien (TW)

( * ) Notice: Subject to any disclaimer, the term of this patent is extended or adjusted under 35 U.S.C. 154(b) by 21 days.

(21) Appl. No.: 10/917,106

(22) Filed: Aug. 12, 2004

(65) Prior Publication Data
US 2006/0034102 A1   Feb. 16, 2006

(51) Int. Cl.
*H02M 3/335* (2006.01)
(52) U.S. Cl. ................... 363/21.13; 363/21.15
(58) Field of Classification Search ............. 363/21.15, 363/21.13, 131
See application file for complete search history.

(56) References Cited

U.S. PATENT DOCUMENTS 6,118,675 A * 9/2000 Lionetto et al. ......... 363/21.13

6,853,563 B1 * 2/2005 Yang et al. ............... 363/21.15

* cited by examiner

*Primary Examiner*—Shawn Riley
(74) *Attorney, Agent, or Firm*—J.C. Patents

(57) ABSTRACT

A close-loop PWM controller for a primary-side controlled power converter is provided. A voltage-waveform detector produces a voltage-feedback signal and a discharge-time signal. A current-waveform detector generates a current-waveform signal by measuring a primary-side switching current. An integrator generates a current-feedback signal by integrating the current-waveform signal with the discharge-time signal. A time constant of the integrator is correlated with a switching period of the switching signal, therefore the current-feedback signal is proportional to the output current of the power converter. The close-loop PWM controller further including a voltage-loop error amplifier and a current-loop error amplifier. A PWM circuit and comparators control the pulse width of the switching signal in response to the outputs of the voltage-loop error amplifier and the current-loop error amplifier. The output voltage and the maximum output current of the power converter are therefore regulated.

18 Claims, 10 Drawing Sheets

CLOSE-LOOP PWM CONTROLLER FOR PRIMARY-SIDE CONTROLLED POWER CONVERTERS

BACKGROUND OF THE INVENTION

1. Field of the Invention

The present invention relates to a pulse width modulation (PWM) controller for a power converter, and more specifically relates to a PWM controller for switching mode power converters.

2. Description of Related Art

Various power converters have been widely used to provide regulated voltage and current. For the sake of safety reasons, an off-line power converter must provide galvanic isolation between its primary side and secondary side. In case that a control circuit is equipped at the primary side of the power converter, an opto-coupler and a secondary-side regulator are needed to regulate an output voltage and an output current of the power converter. The object of the present invention is to provide a PWM controller for controlling the output voltage and the output current of the power converter at the primary side without the need of the opto-coupler and secondary-side regulator. Therefore, the size and the cost of the power converter can be reduced.

SUMMARY OF THE INVENTION

A close-loop PWM controller for a primary-side controlled power converter comprises a voltage-waveform detector producing a voltage-feedback signal and a discharge-time signal. The voltage-waveform detector is coupled to an auxiliary winding of a transformer via a resistor of a divider. The discharge-time signal represents a discharge time of a secondary-side switching current. A current-waveform detector generates a current-waveform signal by sampling a primary-side switching current via a current-sense device. An integrator is used for generating a current-feedback signal by integrating the current-waveform signal with the discharge-time signal. An oscillator generates an oscillation signal for determining a switching frequency of a switching signal. The switching signal is used for switching the transformer and regulating the output of the power converter. The time constant of the integrator is correlated with the switching period of the switching signal, therefore the current-feedback signal is proportional to the output current of the power converter. A first operational amplifier and a first reference voltage form a voltage-loop error amplifier to amplify the voltage-feedback signal and provide a loop gain for output voltage control. A second operational amplifier and a second reference voltage form a current-loop error amplifier to amplify the current-feedback signal and provide a loop gain for output current control. A switching control circuit includes a PWM circuit, a first comparator and a second comparator for generating the switching signal and controlling the pulse width of the switching signal in response to an output of the voltage-loop error amplifier and an output of the current-loop error amplifier. The output voltage and the maximum output current of the power converter are therefore regulated.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF THE PREFERRED EMBODIMENTS

Figure 1:
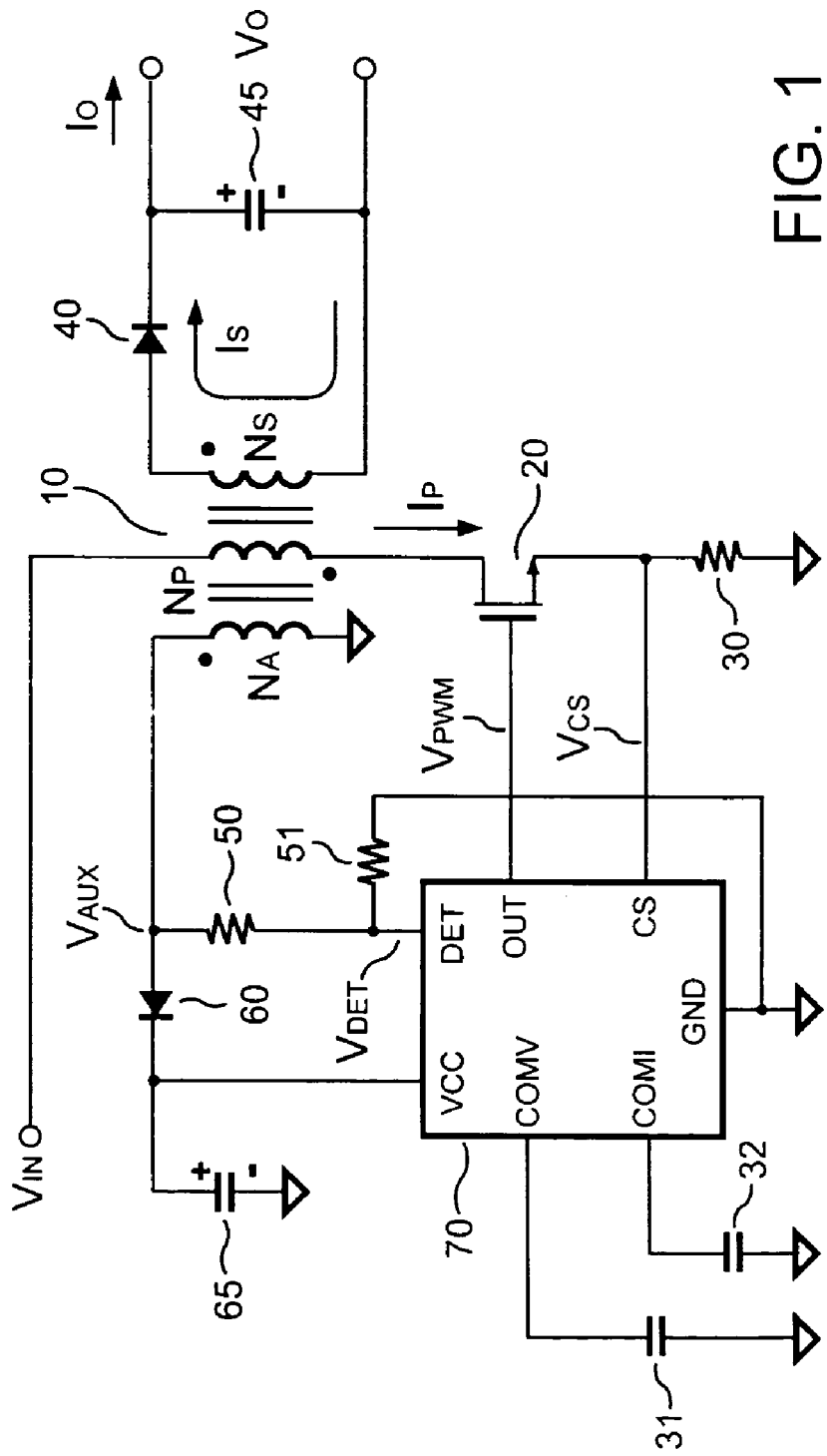
FIG. 1 shows a schematic diagram of a power converter having a close-loop PWM controller.
Figure 2:
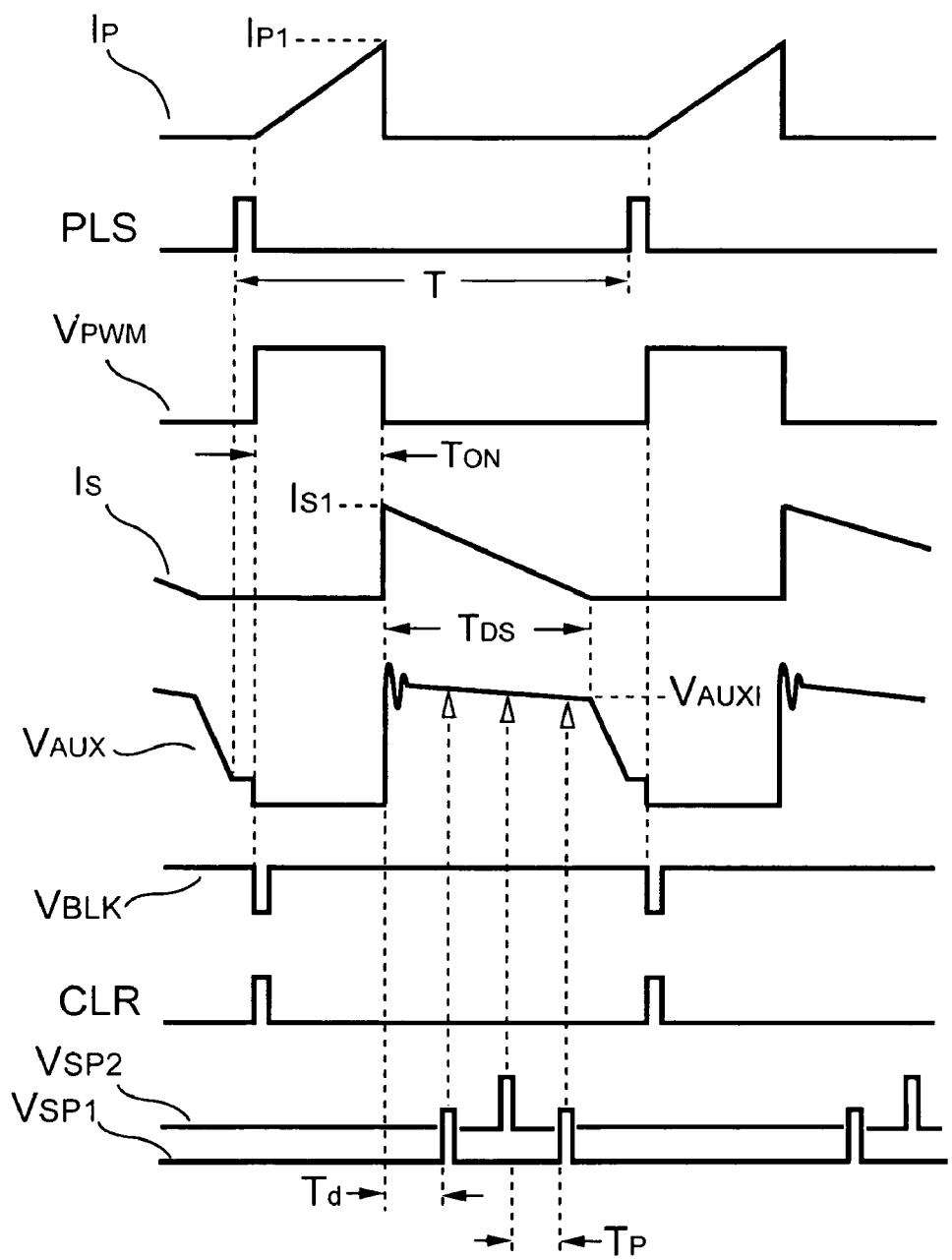
FIG. 2 shows key waveforms of the power converter and the close-loop PWM controller.

FIG. 1 shows a power converter. The power converter includes a transformer 10 having an auxiliary winding $N_A$, a primary winding $N_P$, and a secondary winding $N_S$. In order to regulate an output voltage $V_O$ and an output current $I_O$ of the power converter, a close-loop PWM controller 70 provides a switching signal $V_{PWM}$ to a transistor 20 to switch a transformer 10. FIG. 2 shows various signal waveforms of the power converter in FIG. 1. As the switching signal $V_{PWM}$ is logic-high, a primary-side switching current $I_P$ will be generated accordingly. A peak value $I_{P1}$ of the primary-side switching current $I_P$ can be given by, $$I_{P1} = \frac{V_{IN}}{L_P} \times T_{ON} \quad (1)$$

where $V_{IN}$ is an input voltage applied to the transformer 10; $L_P$ is the inductance of the primary winding $N_P$ of the transformer 10; $T_{ON}$ is an on-time of the switching signal $V_{PWM}$.

Once the switching signal $V_{PWM}$ drops to logic-low, the energy stored in the transformer 10 will be delivered to the secondary side of the transformer 10 and to an output of the power converter via a rectifier 40. A secondary-side switching current $I_S$ is generated accordingly. A peak value $I_{S1}$ of the secondary-side switching current $I_S$ can be expressed by, $$I_{S1} = \frac{(V_O + V_F)}{L_S} \times T_{DS} \quad (2)$$

where $V_O$ is the output voltage of the power converter; $V_F$ is a forward voltage drop of the rectifier 40; $L_S$ is the inductance of the secondary winding $N_S$ of the transformer 10; $T_{DS}$ is a discharge time of the secondary-side switching current $I_S$.

Meanwhile, a reflected voltage $V_{AUX}$ is generated at the auxiliary winding $N_A$ of the transformer 10. The reflected voltage $V_{AUX}$ is given by, $$V_{AUX} = \frac{T_{NA}}{T_{NS}} \times (V_O + V_F) \quad (3)$$

Where $T_{NA}$ and $T_{NS}$ are respectively the winding turns of the auxiliary winding $N_A$ and the secondary winding $N_S$ of the transformer 10.

The reflected voltage $V_{AUX}$ starts to decrease as the secondary-side switching current $I_S$ falls to zero. This also indicates that the energy of the transformer 10 is fully released at this moment. Therefore, as shown in FIG. 2, the discharge time $T_{DS}$ in equation (2) can be measured from the falling edge of the switching signal $V_{PWM}$ to the point that the reflected voltage $V_{AUX}$ starts to fall. The secondary-side switching current $I_S$ is determined by the primary-side switching current $I_P$ and the winding turns of the transformer 10. The secondary-side switching current $I_S$ can be expressed by, $$I_S = \frac{T_{NP}}{T_{NS}} \times I_P \quad (4)$$

where $T_{NP}$ is the winding turns of the primary winding $N_P$ of the transformer 10.

Referring to FIG. 1, the close-loop PWM controller 70 comprises a supply terminal VCC and a ground terminal GND for receiving power. A resistor 50 and a resistor 51 form a divider connected between the auxiliary winding $N_A$ of the transformer 10 and a ground reference level. A detection terminal DET of the close-loop PWM controller 70 is connected to a joint of the resistor 50 and the resistor 51. A voltage $V_{DET}$ generated at the detection terminal DET can be given by, $$V_{DET} = \frac{R_{51}}{R_{50} + R_{51}} \times V_{AUX} \quad (5)$$

where $R_{50}$ and $R_{51}$ are the resistance of the resistors 50 and 51.

The reflected voltage $V_{AUX}$ further charges a capacitor 65 via a rectifier 60 to power the close-loop PWM controller 70. A current-sense resistor 30 serves as a current sense device. The current-sense resistor 30 is connected from a source of the transistor 20 to the ground reference level for converting the primary-side switching current $I_P$ into a primary-side switching current signal $V_{CS}$. A sense terminal CS of the close-loop PWM controller 70 is connected to the current-sense resistor 30 for detecting the primary-side switching current signal $V_{CS}$.

An output terminal OUT of the close-loop PWM controller 70 generates the switching signal $V_{PWM}$ to switch the transformer 10. A voltage-compensation terminal COMV is connected to a first compensation network for voltage-loop frequency compensation. The first compensation network can be a capacitor connected to the ground reference level, such as a capacitor 31. A current-compensation terminal COMI has a second compensation network for current-loop frequency compensation. The second compensation network can also be a capacitor connected to the ground reference level, such as a capacitor 32.

Figure 3:
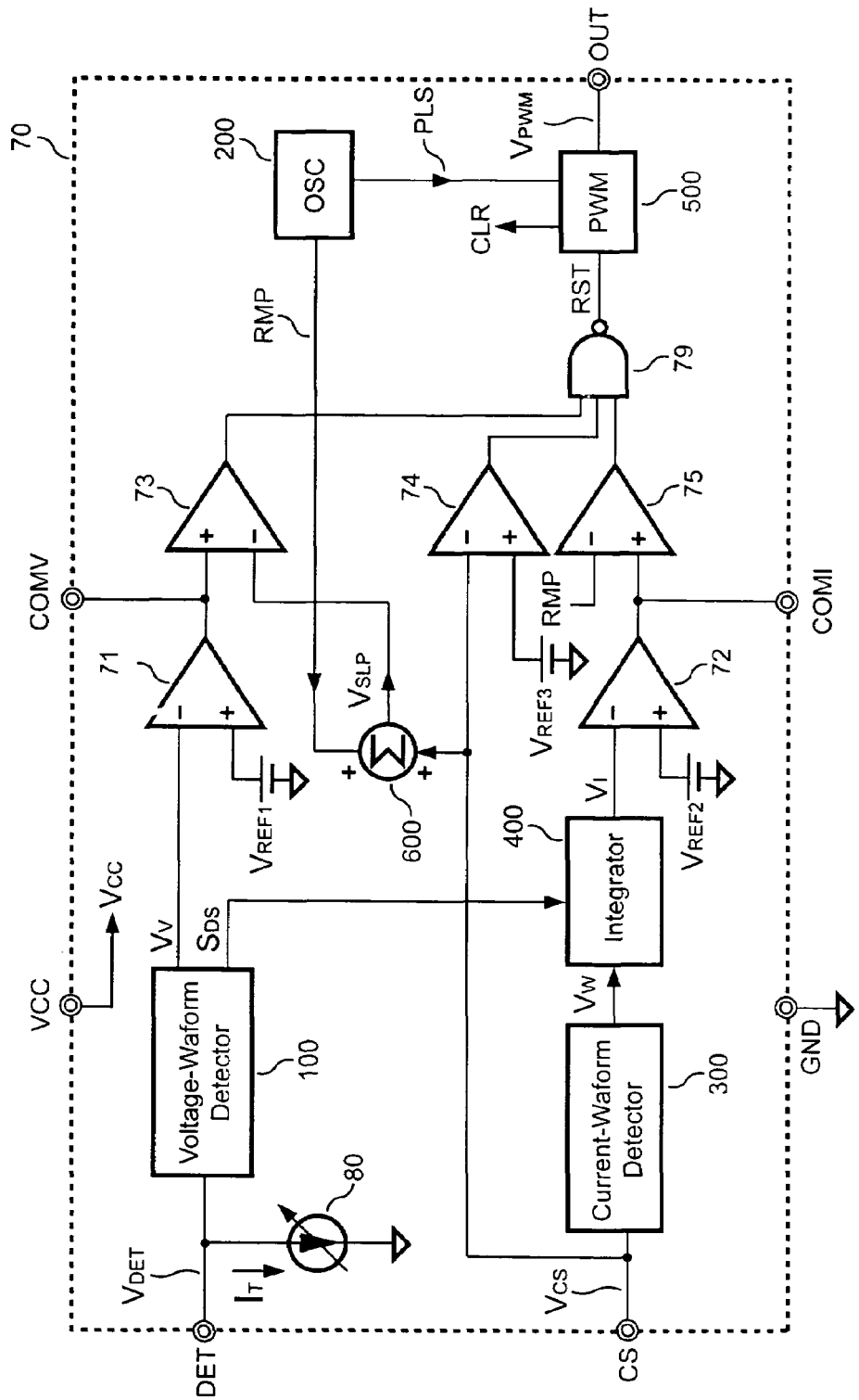
FIG. 3 shows a preferred embodiment of the close-loop PWM controller according to the present invention.

FIG. 3 shows a preferred embodiment of the close-loop PWM controller 70. A voltage-waveform detector 100 produces a voltage-feedback signal $V_V$ and a discharge-time signal $S_{DS}$ by multi-sampling the voltage $V_{DET}$. The discharge-time signal $S_{DS}$ represents the discharge time $T_{DS}$ of the secondary-side switching current $I_S$. A current-waveform detector 300 generates a current-waveform signal $V_W$ by measuring the primary-side switching current signal $V_{CS}$. An oscillator 200 generates an oscillation signal PLS for determining a switching frequency of the switching signal $V_{PWM}$. An integrator 400 produces a current-feedback signal $V_1$ by integrating the current-waveform signal $V_W$ with the discharge-time signal $S_{DS}$. An operational amplifier 71 and a reference voltage $V_{REF1}$ develop a voltage-loop error amplifier for amplifying the voltage-feedback signal $V_V$ and providing a loop gain for output voltage control. An operational amplifier 72 and a reference voltage $V_{REF2}$ develop a current-loop error amplifier for amplifying the current-feedback signal $V_1$ and providing a loop gain for output current control.

A PWM circuit 500 and comparators 73 and 75 form a switching control circuit to generate the switching signal $V_{PWM}$ and control the pulse width of the switching signal $V_{PWM}$ in response to the outputs of the voltage-loop error amplifier and the current-loop error amplifier. Both operational amplifiers 71 and 72 have transconductance output. The output of the operational amplifier 71 is connected to the voltage-compensation terminal COMV and a positive input of the comparator 73. The output of the operational amplifier 72 is connected to the current-compensation terminal COMI and a positive input of the comparator 75. A negative input of the comparator 73 is connected to an output of an adder 600. A negative input of the comparator 75 is supplied with a ramp signal RMP that is produced from the oscillator 200.

The adder 600 generates a slope signal $V_{SLP}$ by adding the primary-side switching current signal $V_{CS}$ with the ramp signal RMP. A positive input of a comparator 74 is supplied with a reference voltage $V_{REF3}$. A negative input of the comparator 74 is connected to the sense terminal CS for achieving a cycle-by-cycle current limit. Three inputs of a NAND gate 79 are respectively connected to the outputs of comparators 73, 74 and 75. An output of the NAND gate 79 generates a reset signal RST. The reset signal RST is supplied to the PWM circuit 500 for controlling the duty cycle of the switching signal $V_{PWM}$.

A current control loop is formed from the detection of the primary-side switching current $I_P$ to the pulse width modulation of the switching signal $V_{PWM}$ to control the magnitude of the primary-side switching current $I_P$ in response to the reference voltage $V_{REF2}$. The secondary-side switching current $I_S$ is a ratio of the primary-side switching current $I_P$ as shown in equation (4). According to the signal waveforms in FIG. 2, the output current $I_O$ of the power converter is the average of the secondary-side switching current $I_S$. It can be expressed by, $$I_O = I_S \times \frac{T_{DS}}{2T} \quad (6)$$

Therefore, the output current $I_O$ of the power converter is regulated.

The current-waveform detector 300 detects the primary-side switching current signal $V_{CS}$ and generates the current-waveform signal $V_W$. The integrator 400 further produces the current-feedback signal $V_1$ by integrating the current-waveform signal $V_W$ with the discharge time $T_{DS}$. The current-feedback signal $V_1$ is thus designed as, $$V_1 = \frac{V_W}{2} \times \frac{T_{DS}}{T_1} \qquad (7)$$

where the current-waveform signal $V_W$ is expressed by, $$V_W = \frac{T_{NS}}{T_{NP}} \times R_S \times I_S \qquad (8)$$

where $T_1$ is a time constant of the integrator 400.

It can be seen from equations (6)–(8), the current-feedback signal $V_1$ can be rewritten as, $$V_1 = \frac{T}{T_1} \times \frac{T_{NS}}{T_{NP}} \times R_S \times I_O \qquad (9)$$

It can be found that the current-feedback signal $V_1$ is proportional to the output current $I_O$ of the power converter. The current-feedback signal $V_1$ is increased as the output current $I_O$ increases. However, the maximum value of the current-feedback signal $V_1$ is limited to the value of the reference voltage $V_{REF2}$ through the regulation of the current control loop. Under feedback control of the current control loop, a maximum output current $I_{O(max)}$ is given by, $$I_{O(max)} = \frac{T_{NP}}{T_{NS}} \times \frac{G_A \times G_{SW} \times V_{REF2}}{1 + \left(G_A \times G_{SW} \times \frac{R_S}{K}\right)} \qquad (10)$$

where K is a constant equal to $T_1/T$; $G_A$ is the gain of the current-loop error amplifier; $G_{SW}$ is the gain of the switching circuit.

As the loop gain of the current control loop is high ($G_A \times G_{SW} \gg 1$), the maximum output current $I_{O(max)}$ could be briefly defined as, $$I_{O(max)} = K \times \frac{T_{NP}}{T_{NS}} \times \frac{V_{REF}}{R_S} \qquad (11)$$

The maximum output current $I_{O(max)}$ of the power converter is thus regulated as a constant current in response to the reference voltage $V_{REF2}$.

Besides, a voltage control loop is developed from the sampling of the reflected voltage $V_{AUX}$ to the pulse width modulation of the switching signal $V_{PWM}$, which control the magnitude of the reflected voltage $V_{AUX}$ in response to the reference voltage $V_{REF1}$. The reflected voltage $V_{AUX}$ is a ratio of the output voltage $V_O$ as shown in equation (3). The reflected voltage $V_{AUX}$ is further attenuated to the voltage $V_{DET}$ as shown in equation (5). The voltage-waveform detector 100 generates the voltage-feedback signal $V_V$ by multi-sampling the voltage $V_{DET}$. The value of the voltage-feedback signal $V_V$ is controlled in response to the value of the reference voltage $V_{REF1}$ through the regulation of the voltage control loop. The voltage-loop error amplifier and the switching circuit provide the loop gain for the voltage control loop. Therefore the output voltage $V_O$ can be briefly defined as, $$V_O = \left(\frac{R_{50} + R_{51}}{R_{50}} \times \frac{T_{NS}}{T_{NA}} \times V_{REF1}\right) - V_F \qquad (12)$$

The reflected voltage $V_{AUX}$ is multi-sampled by the voltage-waveform detector 100. The voltage is sampled and measured instantly before the secondary-side switching current $I_S$ falls to zero. Therefore the variation of the secondary-side switching current $I_S$ does not affect the value of the forward voltage drop $V_F$ of the rectifier 40. However, the voltage drop $V_F$ of the rectifier 40 varies when the temperature changes. A programmable current source 80 is connected to an input of the voltage-waveform detector 100 for temperature compensation. The programmable current source 80 produces a programmable current $I_T$ in response to the junction temperature of the PWM controller 70. The programmable current $I_T$ and resistors 50, 51 generates a voltage $V_T$ to compensate the temperature variation of the forward voltage drop $V_F$ of the rectifier 40.

$$V_T = I_T \times \frac{R_{50} \times R_{51}}{R_{50} + R_{51}} \qquad (13)$$

Referring to equations (12) and (13), the ratio of resistors $R_{50}$ and $R_{51}$ determines the output voltage $V_O$. The resistance of resistors $R_{50}$ and $R_{51}$ determine the temperature coefficient for compensating the voltage drop $V_F$ of the rectifier 40. Due to the programmable current source 80, the equation (12) can be rewritten as, $$V_O = \left(\frac{R_{50} + R_{51}}{R_{50}} \times \frac{T_{NS}}{T_{NA}} \times V_{REF1}\right) - V_F + V_T \qquad (14)$$

Figure 4:
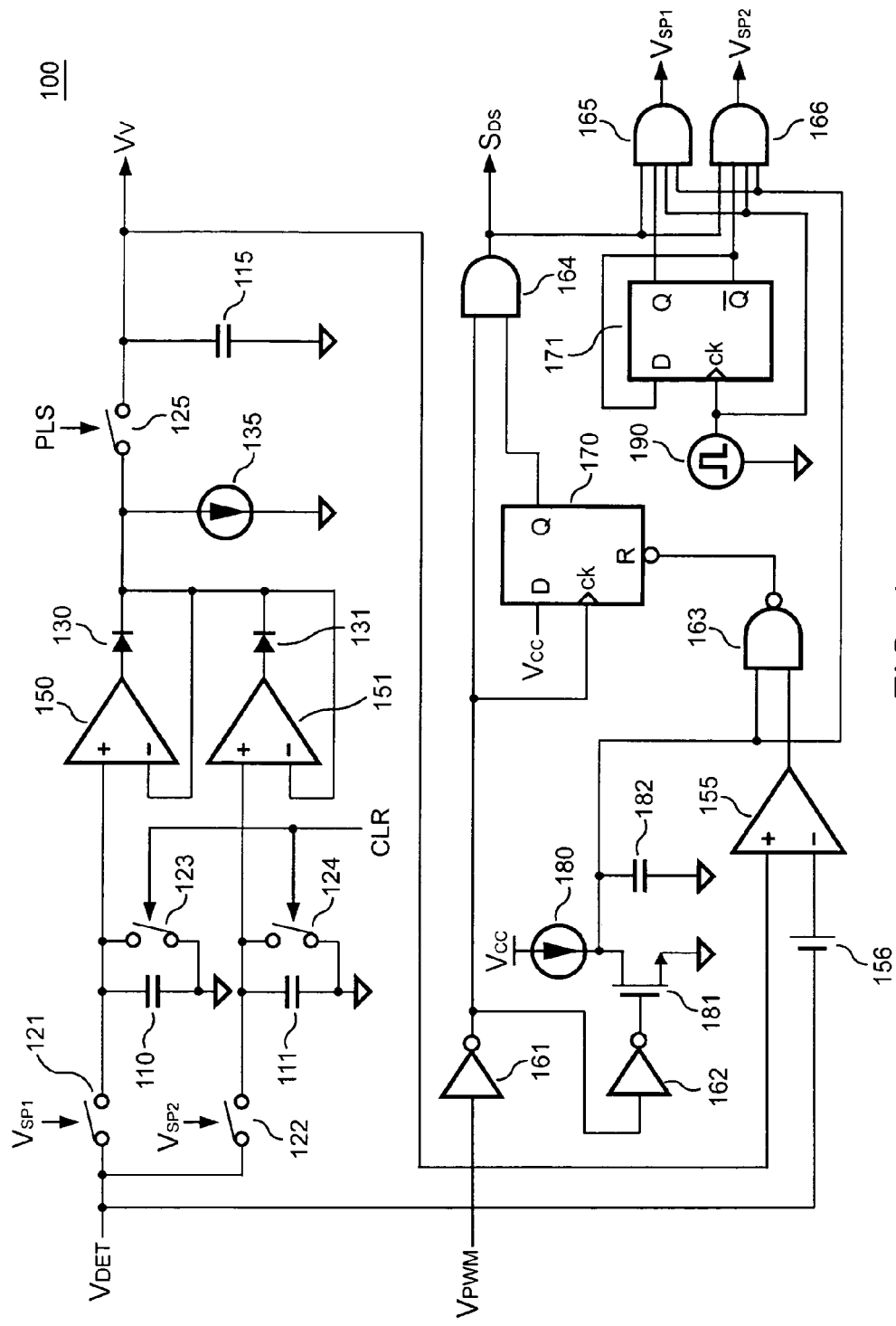
FIG. 4 shows a preferred embodiment of a voltage-waveform detector according to the present invention.

FIG. 4 shows a preferred embodiment of the voltage-waveform detector 100 according to the present invention. A sample-pulse generator 190 produces a sample-pulse signal for multi-sampling. A threshold voltage 156 is added up with the reflected voltage $V_{AUX}$ to produce a level-shift reflected signal. A first signal generator includes a D flip-flop 171, two AND gates 165, 166 for producing a first sample signal $V_{SP1}$ and a second sample signal $V_{SP2}$. A second signal generator comprises a D flip-flop 170, an NAND gate 163, an AND gate 164 and a comparator 155 for producing the discharge-time signal $S_{DS}$. A time-delay circuit includes an inverter 162, a current source 180, a transistor 181 and a capacitor 182 for generating a delay time $T_d$ as the switching signal $V_{PWM}$ is disabled. An input of an inverter 161 is supplied with the switching signal $V_{PWM}$. An output of the inverter 161 is connected to an input of the inverter 162, a first input of the AND gate 164 and a clock-input of the D flip-flop 170. An output of the inverter 162 turns on/off the transistor 181. The capacitor 182 is connected in parallel with the transistor 181. The current source 180 is applied to charge the capacitor 182. Therefore the current of the current source 180 and the capacitance of the capacitor 182 determine the delay time $T_d$ of the time-delay circuit. An output of the time-delay circuit is obtained across the capacitor 182. A D-input of the D flip-flop 170 is pulled high by a supply voltage $V_{CC}$. An output of the D flip-flop 170 is connected to a second input of the AND gate 164. The AND gate 164 outputs the discharge-time signal $S_{DS}$. The discharge-time signal $S_{DS}$ is thus enabled as the switching signal $V_{PWM}$ is disabled. The output of the NAND gate 163 is connected to a reset-input of the D flip-flop 170. Two inputs of the NAND gate 163 are respectively connected to the output of the time-delay circuit and the output of the comparator 155. A negative input of the comparator 155 is supplied with the level-shift reflected signal. A positive input of the comparator 155 is supplied with the voltage-feedback signal $V_V$. Therefore, after the delay time $T_d$, the discharge-time signal $S_{DS}$ can be disabled once the level-shift reflected signal is lower than the voltage-feedback signal $V_V$. Besides, the discharge-time signal $S_{DS}$ can also be disabled as long as the switching signal $V_{PWM}$ is enabled.

The sample-pulse signal is supplied to a clock-input of the D flip-flop 171 and third inputs of AND gates 165 and 166. A D-input and an inverse output of the D flip-flop 171 are connected together to form a divided-by-two counter. An output and the inverse output of the D flip-flop 171 are respectively connected to second inputs of AND gates 165 and 166. First inputs of AND gates 165 and 166 are both supplied with the discharge-time signal $S_{DS}$. Fourth inputs of AND gates 165 and 166 are connected to the output of the time-delay circuit. Therefore the first sample signal $V_{SP1}$ and the second sample signal $V_{SP2}$ are generated in response to the sample-pulse signal. Besides, the first sample signal $V_{SP1}$, and the second sample signal $V_{SP2}$ are alternately produced during an enabled period of the discharge-time signal $S_{DS}$. However, the delay time $T_d$ is inserted at the beginning of the discharge-time signal $S_{DS}$ to inhibit the first sample signal $V_{SP1}$ and the second sample signal $V_{SP2}$. The first sample signal $V_{SP1}$ and the second sample signal $V_{SP2}$ are thus disabled during the period of the delay time $T_d$.

The first sample signal $V_{SP1}$ and the second sample signal $V_{SP2}$ are used for alternately sampling the reflected voltage $V_{AUX}$ via the detection terminal DET and the divider. The first sample signal $V_{SP1}$ and the second sample signal $V_{SP2}$ control a switch 121 and a switch 122 for obtaining a first hold voltage and a second hold voltage across a capacitor 110 and a capacitor 111 respectively. A switch 123 is connected in parallel with the capacitor 110 to discharge the capacitor 110. A switch 124 is connected in parallel with the capacitor 111 to discharge the capacitor 111. A buffer amplifier includes operational amplifiers 150 and 151, diodes 130, 131, a current source 135 for generating a hold voltage. The positive inputs of operational amplifiers 150 and 151 are connected to the capacitor 110 and capacitor 111 respectively. The negative inputs of the operational amplifiers 150 and 151 are connected to an output of the buffer amplifier. The diode 130 is connected from an output of the operational amplifier 150 to the output of the buffer amplifier. The diode 131 is connected from an output of the operational amplifier 151 to the output of the buffer amplifier. The hold voltage is thus obtained from the higher voltage of the first hold voltage and the second hold voltage. The current source 135 is used for the termination. A switch 125 periodically conducts the hold voltage to a capacitor 115 for producing the voltage-feedback signal $V_V$. The oscillation signal PLS turns on/off the switch 125. After the delay time $T_d$, the first sample signal $V_{SP1}$ and the second sample signal $V_{SP2}$ start to produce the first hold voltage and the second hold voltage This eliminates the spike interference of the reflected voltage $V_{AUX}$. The spike interference of the reflected voltage $V_{AUX}$ would occur when the switching signal $V_{PWM}$ is disabled and the transistor 20 is turned off.

As the secondary-side switching current $I_S$ falls to zero, the reflected voltage $V_{AUX}$ starts to decrease. This will be detected by the comparator 155 to disable the discharge-time signal $S_{DS}$. Therefore, the pulse width of the discharge-time signal $S_{DS}$ can be correlated to the discharge time $T_{DS}$ of the secondary-side switching current $I_S$ Meanwhile, the first sample signal $V_{SP1}$ and the second sample signal $V_{SP2}$ are disabled, and the multi-sampling is stopped as discharge-time signal $S_{DS}$ is disabled. At the moment, the hold voltage generated at the output of the buffer amplifier is thus correlated to the reflected voltage $V_{AUX}$ that is sampled just before the secondary-side switching current $I_S$ falls to zero. The hold voltage is obtained from the higher voltage of the first hold voltage and the second hold voltage, which will ignore the voltage that is sampled when the reflected voltage had started to decrease.

Figure 5:
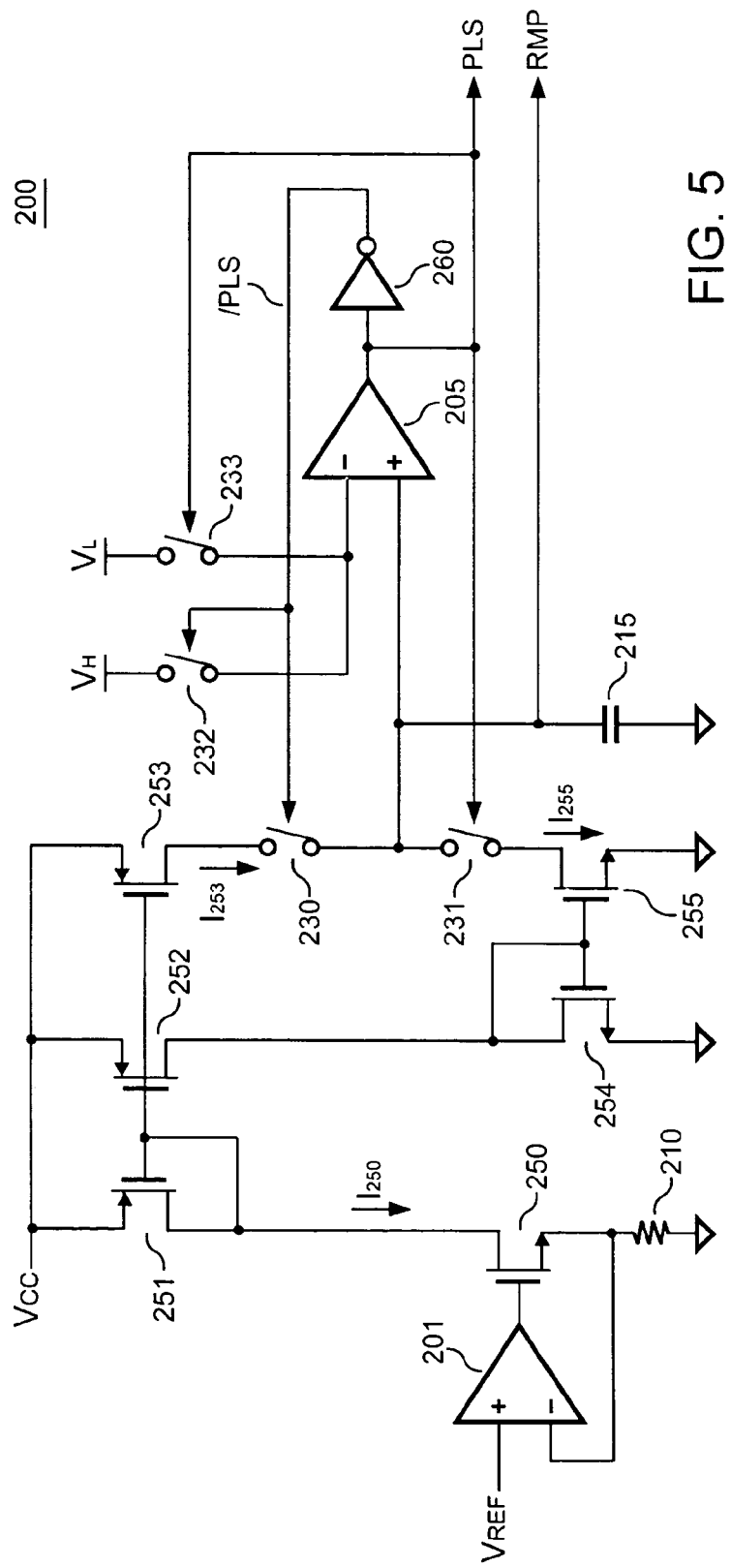
FIG. 5 shows a preferred embodiment of an oscillator according to the present invention.

FIG. 5 shows a preferred embodiment of the oscillator 200 according to the present invention. An operational amplifier 201, a resistor 210 and a transistor 250 form a first V-to-I converter. The first V-to-I converter generates a reference current $I_{250}$ in response to a reference voltage $V_{REF}$. A plurality of transistors, for example, transistors 251, 252, 253, 254 and 255 form current mirrors for generating an oscillator charge current $I_{253}$ and an oscillator discharge current $I_{255}$ in response to the reference current $I_{250}$. A drain of the transistor 253 generates the oscillator charge current $I_{253}$. A drain of the transistor 255 generates the oscillator discharge current $I_{255}$. A switch 230 is connected between the drain of the transistor 253 and a capacitor 215. A switch 231 is connected between the drain of the transistor 255 and the capacitor 215. The ramp signal RMP is obtained across the capacitor 215. A comparator 205 has a positive input connected to the capacitor 215. The comparator 205 outputs the oscillation signal PLS. The oscillation signal PLS determines the switching frequency of the switching signal $V_{PWM}$. A first terminal of a switch 232 is supplied with a high threshold voltage $V_H$. A first terminal of a switch 233 is supplied a low threshold voltage $V_L$. A second terminal of the switch 232 and a second terminal of the switch 233 are both connected to a negative input of the comparator 205. An input of an inverter 260 is connected to an output of the comparator 205 for producing an inverse oscillation signal /PLS. The oscillation signal PLS turns on/off the switch 231 and the switch 233. The inverse oscillation signal /PLS turns on/off the switch 230 and the switch 232. The resistance $R_{210}$ of the resistor 210 and the capacitance $C_{215}$ of the capacitor 215 determine a switching period T of the switching frequency, $$T = \frac{C_{215} \times V_{OSC}}{V_{REF}/R_{210}} = R_{210} \times C_{215} \times \frac{V_{OSC}}{V_{REF}} \quad (15)$$

where $V_{OSC}=V_H-V_L$.

Figure 6:
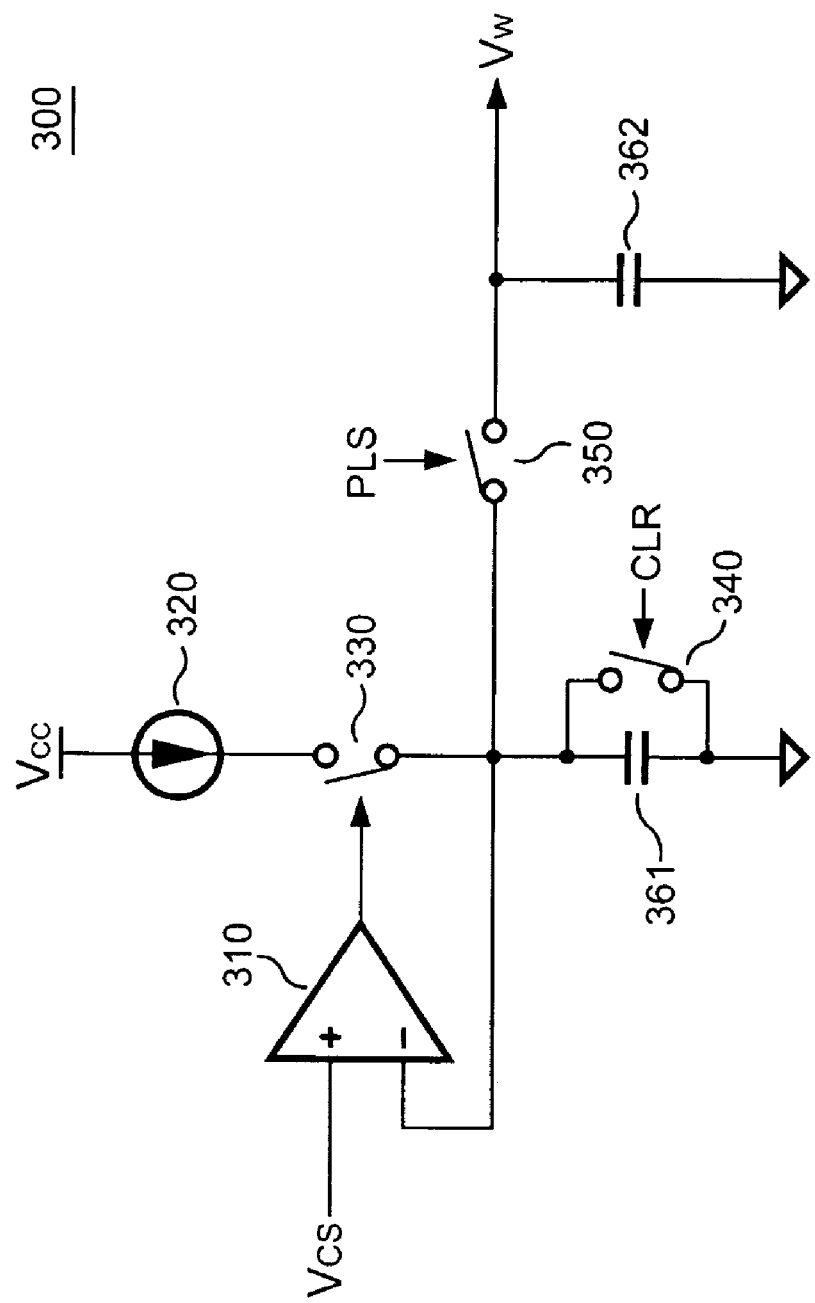
FIG. 6 shows a preferred embodiment of a current-waveform detector according to the present invention.

FIG. 6 shows a preferred embodiment of the current-waveform detector 300 according to the present invention. A peak detector includes a comparator 310, a current source 320, switches 330, 340, and a capacitor 361. The peak value of the primary-side switching current signal $V_{CS}$ is sampled for generating a peak-current signal. A positive input of the comparator 310 is supplied with the primary-side switching current signal $V_{CS}$. A negative input of the comparator 310 is connected to the capacitor 361. The switch 330 is connected between the current source 320 and the capacitor 361.

An output of the comparator 310 turns on/off the switch 330. The switch 340 is connected in parallel with the capacitor 361 for discharging the capacitor 361. A switch 350 periodically conducts the peak-current signal to a capacitor 362 for producing the current-waveform signal $V_W$. The switch 350 is turned on/off by the oscillation signal PLS.

Figure 7:
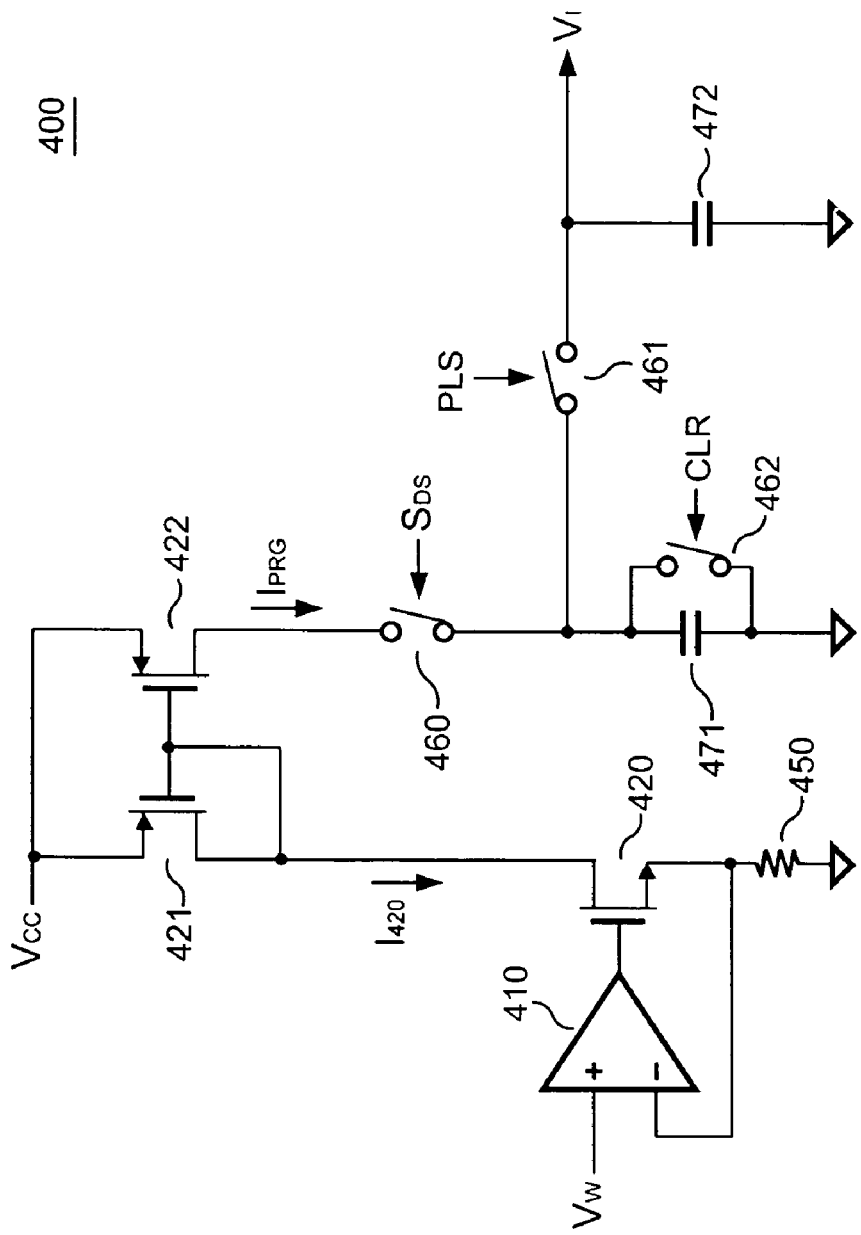
FIG. 7 shows a preferred embodiment of an integrator according to the present invention.

FIG. 7 shows a preferred embodiment of the integrator 400 according to the present invention. A second V-to-I converter comprises an operational amplifier 410, a resistor 450 and transistors 420, 421, 422. A positive input of the operational amplifier 410 is supplied with the current-waveform signal $V_W$. A negative input of the operational amplifier 410 is connected to the resistor 450. An output of the operational amplifier 410 drives a gate of the transistor 420. A source of the transistor 420 is coupled to the resistor 450. The second V-to-I converter generates a current $I_{420}$ via a drain of the transistor 420 in response to the current-waveform signal $V_W$. Transistors 421 and 422 form a current mirror having a 2:1 ratio. The current mirror is driven by the current $I_{420}$ to produce a programmable charge current $I_{PRG}$ via a drain of the transistor 422. The programmable charge current $I_{PRG}$ can be expressed by, $$I_{PRG} = \frac{1}{R_{450}} \times \frac{V_W}{2} \qquad (16)$$

where $R_{450}$ is the resistance of the resistor 450.

A capacitor 471 is used to produce an integrated signal. A switch 460 is connected between the drain of the transistor 422 and the capacitor 471. The switch 460 is turned on/off by the discharge-time signal $S_{DS}$. A switch 462 is connected in parallel with the capacitor 471 for discharging the capacitor 471. A switch 461 periodically conducts the integrated signal to a capacitor 472 for producing the current-feedback signal $V_1$. The oscillation signal PLS turns on/off the switch 461. The current-feedback signal $V_1$ is therefore obtained across the capacitor 472.

$$V_I = \frac{1}{R_{450} \times C_{471}} \times \frac{V_W}{2} \times T_{DS} \qquad (17)$$

According to the preferred embodiment in FIG. 4~7, the current-feedback signal $V_1$ is correlated to the secondary-side switching current $I_S$ and the output current $I_O$ of the power converter. Thus, the equation (9) can be rewritten as, $$V_I = m \times \frac{T_{NS}}{T_{NP}} \times R_S \times I_O \qquad (18)$$

where m is a constant, which can be determined by, $$m = \frac{R_{210} \times C_{215}}{R_{450} \times C_{471}} \times \frac{V_{OSC}}{V_{REF}} \qquad (19)$$

The resistance $R_{450}$ of the resistor 450 is correlated to the resistance $R_{210}$ of the resistor 210. The capacitance $C_{471}$ of the capacitor 471 is correlated to the capacitance $C_{215}$ of the capacitor 215. Therefore, the current-feedback signal $V_1$ is proportional to the output current $I_O$ of the power converter.

Figure 8:
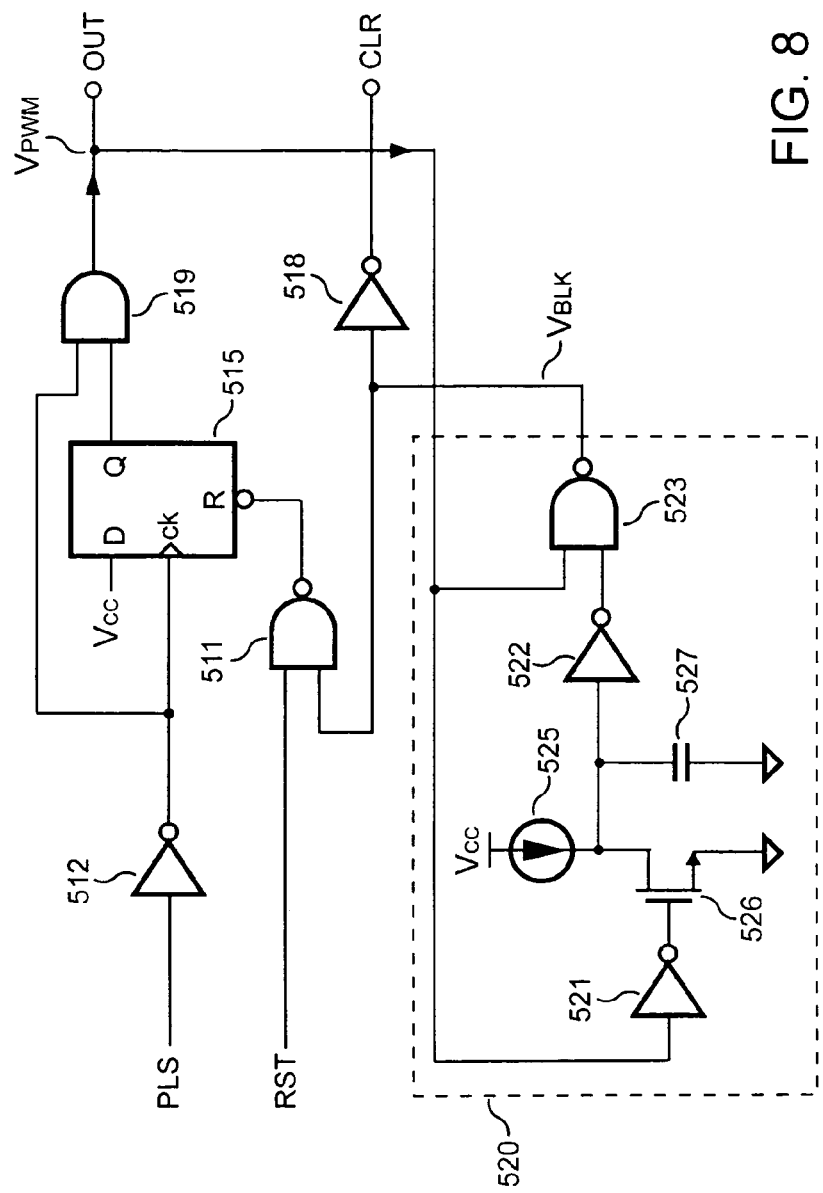
FIG. 8 shows a circuit schematic of a PWM circuit according to the present invention.

FIG. 8 shows a circuit schematic of the PWM circuit 500 according to the present invention. The PWM circuit 500 includes a NAND gate 511, a D flip-flop 515, an AND gate 519, a blanking circuit 520 and inverters 512, 518. A D-input of the D flip-flop 515 is pulled high by the supply voltage $V_{CC}$. The oscillation signal PLS drives an input of the inverter 512. An output of the inverter 512 is connected to a clock-input of the D flip-flop 515 for enabling the switching signal $V_{PWM}$. An output of the D flip-flop 515 is connected to a first input of the AND gate 519. A second input of the AND gate 519 is coupled to the output of the inverter 512. The AND gate 519 outputs the switching signal $V_{PWM}$ to switch the transformer 10. A reset-input of the D flip-flop 515 is connected to an output of the NAND gate 511. A first input of the NAND gate 511 is supplied with the reset signal RST for cycle-by-cycle disabling the switching signal $V_{PWM}$. The second input of the NAND gate 511 is connected to an output of the blanking circuit 520 for ensuring a minimum on-time of the switching signal $V_{PWM}$ when the switching signal $V_{PWM}$ is enabled. The minimum on-time of the switching signal $V_{PWM}$ ensures a minimum value of the discharge time $T_{DS}$, which ensures a proper multi-sampling of the reflected voltage $V_{AUX}$ in the voltage-waveform detector 100. The discharge time $T_{DS}$ is correlated to the on-time of the switching signal $V_{PWM}$. Referring to equations (1), (2), (4) and the secondary inductance $L_S$, which is shown in equation (20), the discharge time $T_{DS}$ can be expressed as equation (21) shows:

$$L_S = (T_{NS}/T_{NP})^2 \times L_P \qquad (20)$$

$$T_{DS} = \left(\frac{V_{IN}}{V_O + V_F}\right) \times \frac{T_{NS}}{T_{NP}} \times T_{ON} \qquad (21)$$

where $T_{ON}$ is the on-time of the switching signal $V_{PWM}$.

An input of the blanking circuit 520 is supplied with the switching signal $V_{PWM}$. When the switching signal $V_{PWM}$ is enabled, the blanking circuit 520 will generate a blanking signal $V_{BLK}$ to inhibit the reset of the D flip-flop 515. The blanking circuit 520 further comprises an NAND gate 523, a current source 525, a capacitor 527, a transistor 526 and inverters 521, 522. The switching signal $V_{PWM}$ is supplied to an input of the inverter 521 and the first input of the NAND gate 523. The current source 525 is applied to charge the capacitor 527. The capacitor 527 is connected in parallel with the transistor 526. An output of the inverter 521 turns on/off the transistor 526. An input of the inverter 522 is coupled to the capacitor 527. An output of the inverter 522 is connected to a second input of the NAND gate 523. An output of the NAND gate 523 outputs the blanking signal $V_{BLK}$. The current of the current source 525 and the capacitance of the capacitor 527 determine the pulse width of the blanking signal $V_{BLK}$. An input of an inverter 518 is connected to the output of the NAND gate 523. An output of the inverter 518 generates a clear signal CLR to turn on/off switches 123, 124, 340 and 462.

Figure 9:
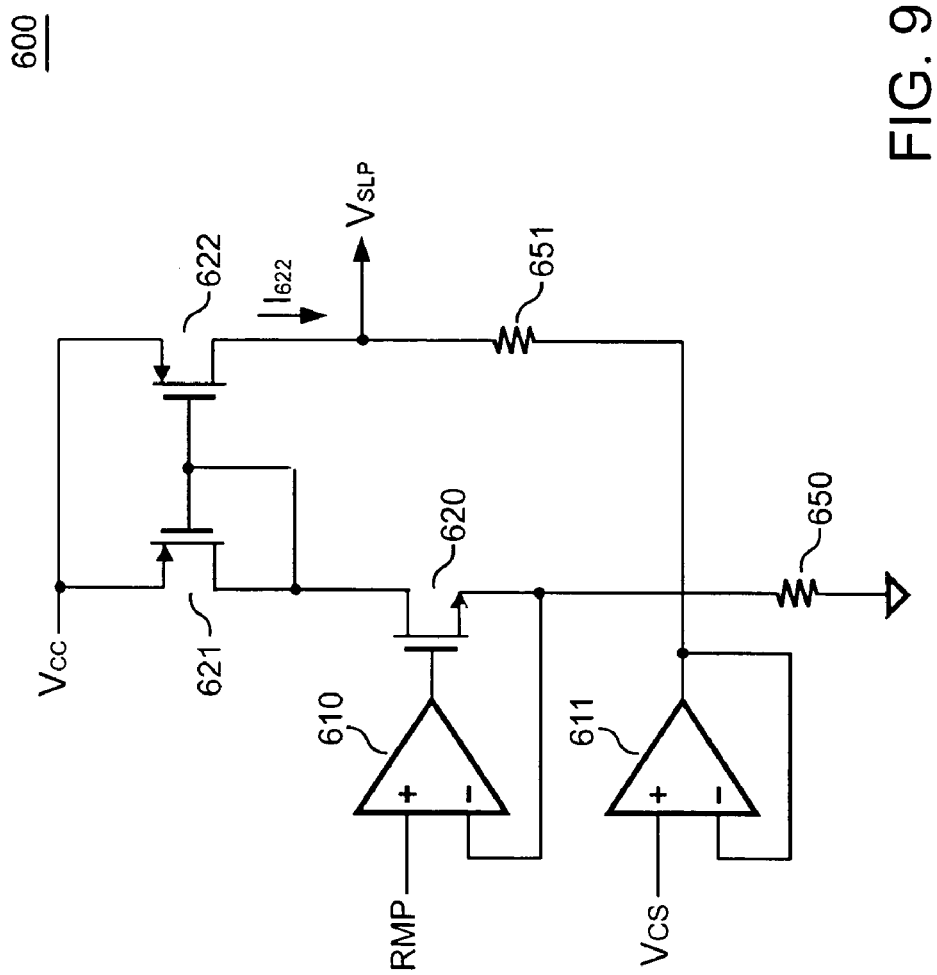
FIG. 9 shows a circuit schematic of an adder according to the present invention.

FIG. 9 shows a circuit schematic of the adder 600 according to the present invention. An operational amplifier 610, transistors 620, 621, 622 and a resistor 650 develop a third V-to-I converter for generating a current $I_{622}$ in response to the ramp signal RMP. A positive input of an operational amplifier 611 is supplied with the primary-side switching current signal $V_{CS}$. A negative input and an output of the operational amplifier 611 are connected together to build the operational amplifier 611 as a buffer. A drain of the transistor 622 is connected to the output of the operational amplifier 611 via a resistor 651. The slope signal $V_{SLP}$ is generated at the drain of the transistor 622. The slope signal $V_{SLP}$ is therefore correlated to the ramp signal RMP and the primary-side switching current signal $V_{CS}$.

Figure 10:
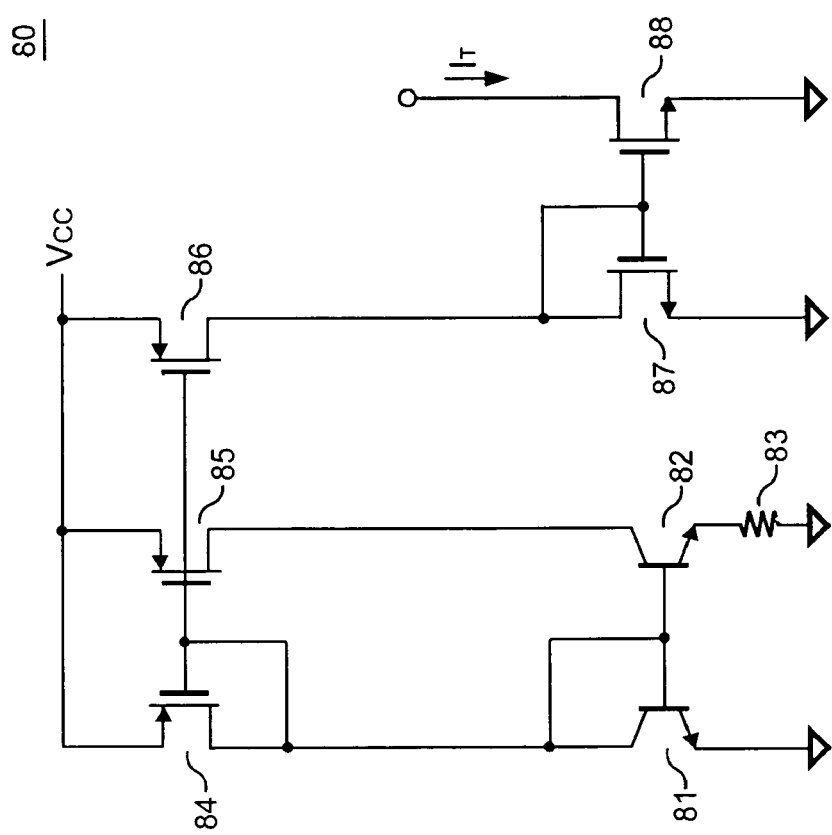
FIG. 10 shows a circuit schematic of a programmable current source according to the present invention.

FIG. 10 shows a circuit schematic of the programmable current source 80 that generates the programmable current $I_T$ in response to temperature variation. The programmable current generator 80 comprises two bipolar transistors 81 and 82, three p-mirror transistors 84, 85, and 86, two n-mirror transistors 87 and 88 and a resistor 83. The programmable current $I_T$ is given by, $$I_T = N_M \times \frac{k \times T_{emp}}{q} \times \frac{\ln(r)}{R_T} \qquad (22)$$

where $R_T$ is the resistance of resistor 83; $N_M = M_1 \times M_2$; $M_1$ is the geometrical ratio of the transistor 85 and 86; $M_2$ is the geometrical ratio of the transistor 87 and 88; k is the Boltzmann's constant; q is the charge on an electron; r is the emitter area ratio of the bipolar transistor 81 and 82; and $T_{emp}$ is the absolute temperature.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A close-loop PWM controller for a primary-side controlled power converter, comprising:
   a voltage-waveform detector, coupled to a transformer, for generating a voltage-feedback signal and a discharge-time signal by measuring a reflected voltage from said transformer, wherein said discharge-time signal represents a discharge time of a secondary-side switching current of said transformer;
   a current-waveform detector and an integrator, for producing a current-feedback signal by integrating a current-waveform signal with said discharge-time signal, wherein said current-waveform signal is generated by measuring a primary-side switching current of said transformer through a current-sense device;
   a voltage-loop error amplifier and a current-loop error amplifier, for amplifying said voltage-feedback signal and said current-feedback signal respectively; and
   a switching control circuit, for generating a switching signal in response to an output of said voltage-loop error amplifier and an output of said current-loop error amplifier, wherein said switching signal is used for switching said transformer and regulating an output of the power converter.

2. The close-loop PWM controller as claimed in claim 1, further comprising:
   a supply terminal and a ground terminal, for receiving power;
   a detection terminal, for connecting said voltage-waveform detector to said transformer through a resistor of a divider;
   a sense terminal, for connecting said current-waveform detector to said current-sense device for receiving a primary-side switching current signal, wherein said current-sense device is used for converting said primary-side switching current to said primary-side switching current signal;
   an output terminal, for generating said switching signal to switch said transformer via a switching device;
   a voltage-compensation terminal, connected to a first-compensation network for voltage-loop frequency compensation; and
   a current-compensation terminal, connected to a second-compensation network for current-loop frequency compensation.

3. The close-loop PWM controller as claimed in claim 1, further comprising a programmable current source, connected to an input of said voltage-waveform detector for temperature compensation, wherein said programmable current source produces a programmable current in response to the junction temperature of the close-loop PWM controller.

4. The close-loop PWM controller as claimed in claim 1, wherein a time constant of said integrator is correlated with a switching period of said switching signal.

5. The close-loop PWM controller as claimed in claim 1, wherein said voltage-waveform detector comprises:
   a sample-pulse generator, for producing a sample-pulse signal;
   a threshold voltage, wherein said threshold voltage adds said reflected voltage to produce a level-shift signal;
   a first capacitor and a second capacitor;
   a first signal generator, for producing a first sample signal and a second sample signal, wherein said first sample signal and said second sample signal are used for alternately sampling said reflected voltage, wherein a first hold voltage and a second hold voltage are respectively held across said first capacitor and said second capacitor; wherein said first sample signal and said second sample signal are alternately generated in response to said sample-pulse signal during an enabled period of said discharge-time signal; wherein a delay time is inserted at the beginning of said discharge-time signal, wherein said first sample signal and said second sample signal are disabled during the period of said delay time;
   a buffer amplifier, for generating a hold signal from the higher voltage of said first hold voltage and said second hold voltage;
   a first output capacitor, for holding said hold signal to be said voltage-feedback signal; and
   a second signal generator, for producing said discharge-time signal, wherein said discharge-time signal is enabled as said switching signal is disabled, wherein after said delay time said discharge-time signal can be disabled when said level-shift signal is lower than said voltage-feedback signal, and wherein said discharge-time signal can be disabled as long as said switching signal is enabled.

6. The close-loop PWM controller as claimed in claim 1, wherein said voltage-waveform detector multi-samples said reflected voltage to generate said voltage-feedback signal; wherein said voltage-feedback signal is obtained instantly before said secondary-side switching current drops to zero.

7. The close-loop PWM controller as claimed in claim 1, wherein said current-waveform detector comprises:
   a peak detector, for generating a peak-current signal by sampling a peak value of said primary-side switching current signal;
   a third capacitor, for holding said peak-current signal;
   a second output capacitor, for producing said current-waveform; and
   a switch, for conducting said peak-current signal to said second output capacitor.

8. The close-loop PWM controller as claimed in claim 1, wherein said integrator comprises:
- a second V-to-I converter, formed by a timing operational amplifier, a timing resistor and timing transistors, wherein said second V-to-I converter generates a programmable charge current in response to said current-waveform signal;
- a timing capacitor, for producing an integrated signal;
- a first switch, wherein a first terminal of said first switch is supplied with said programmable charge current and a second terminal of said first switch is connected to said timing capacitor; wherein said discharge-time signal turns on/off said first switch;
- a second switch, connected in parallel with said timing capacitor for discharging said timing capacitor;
- a third output capacitor, for producing said current-feedback signal; and
- a third switch, for conducting said integrated signal to said third output capacitor.

9. The close-loop PWM controller as claimed in claim 1, wherein said switching signal has a minimum on-time when said switching signal is enabled, which further ensures a minimum value of said discharge time for multi-sampling said reflected voltage.

10. A close-loop PWM controller for a primary-side controlled power converter, comprising:
- a voltage-waveform detector, for producing a voltage-feedback signal and a discharge-time signal by multi-sampling a reflected voltage from an auxiliary winding of a transformer, wherein said discharge-time signal represents a discharge time of a secondary-side switching current;
- a current-waveform detector, for generating a current-waveform signal by measuring a primary-side switching current signal, wherein said primary-side switching current signal is converted from a primary-side switching current;
- an oscillator, for generating an oscillation signal to determine a switching frequency of a switching signal, wherein said switching signal is used for switching said transformer and regulating an output of the power converter;
- an integrator, for producing a current-feedback signal by integrating said current-waveform signal with said discharge-time signal;
- a voltage-loop error amplifier, including a first operational amplifier and a first reference voltage for amplifying said voltage-feedback signal and providing a loop gain for output voltage control;
- a current-loop error amplifier, including a second operational amplifier and a second reference voltage for amplifying said current-feedback signal and providing a loop gain for output current control;
- a PWM circuit, associated with a first comparator and a second comparator to control the pulse width of said switching signal in response to an output of said voltage-loop error amplifier and an output of said current-loop error amplifier; and
- a programmable current source, for connecting to an input of said voltage-waveform detector for temperature compensation, wherein said programmable current source produces a programmable current in response to a junction temperature of said close-loop PWM controller.

11. The close-loop PWM controller as claimed in claim 10, further comprising:
- a supply terminal and a ground terminal, for receiving power;
- a detection terminal, for connecting said voltage-waveform detector to said auxiliary winding of said transformer through a resistor of a divider;
- a sense terminal, for connecting said current-waveform detector to a current-sense device and receiving said primary-side switching current signal;
- an output terminal, for generating said switching signal to switch said transformer via a switching device;
- a voltage-compensation terminal, for connecting a first-compensation network to a ground reference level for voltage-loop frequency compensation; and
- a current-compensation terminal, for connecting a second-compensation network to said ground reference level for current-loop frequency compensation.

12. The close-loop PWM controller as claimed in claim 10, wherein a time constant of said integrator is correlated with a switching period of said switching signal.

13. The close-loop PWM controller as claimed in claim 10, wherein said voltage-waveform detector comprises:
- a sample-pulse generator, for producing a sample-pulse signal;
- a threshold voltage, for adding said reflected voltage to produce a level-shift signal;
- a first capacitor and a second capacitor;
- a first signal generator, for producing a first sample signal and a second sample signal, wherein said first sample signal and said second sample signal are used for alternately sampling said reflected voltage, wherein a first hold voltage and a second hold voltage are respectively held across said first capacitor and said second capacitor, wherein said first sample signal and said second sample signal are alternately generated in response to said sample-pulse signal during an enabled period of said discharge-time signal, wherein a delay time is inserted at the beginning of said discharge-time signal, and wherein said first sample signal and said second sample signal are disabled during the period of said delay time;
- a buffer amplifier, for generating a hold signal from the higher voltage of said first hold voltage and said second hold voltage;
- a first output capacitor, for holding said hold signal to be said voltage-feedback signal; and
- a second signal generator, for producing said discharge-time signal, wherein said discharge-time signal is enabled as said switching signal is disabled, wherein after said delay time said discharge-time signal can be disabled when said level-shift signal is lower than said voltage-feedback signal, and wherein said discharge-time signal can also be disabled as long as said switching signal is enabled.

14. The close-loop PWM controller as claimed in claim 10, wherein said voltage-waveform detector multi-sampling said reflected voltage to generate said voltage-feedback signal; wherein said voltage-feedback signal is instantly obtained before the secondary-side switching current drops to zero.

15. The close-loop PWM controller as claimed in claim 10, wherein said oscillator comprises:
- a first V-to-I converter, for generating an osc charge current and an osc discharge current, wherein said first V-to-I converter includes an osc operational amplifier, an osc resistor and osc transistors;

an osc capacitor;

a first osc switch, wherein a first terminal of said first osc switch is supplied with said osc charge current and a second terminal of said first osc switch is connected to said osc capacitor;

a second osc switch, wherein a first terminal of said second osc switch is connected to said osc capacitor and a second terminal of said second osc switch is driven by said osc discharge current;

an osc comparator, having a positive input connected to said osc capacitor, wherein said osc comparator generates said oscillation signal;

a third osc switch, having a first terminal supplied with a high threshold voltage and a second terminal connected to a negative input of said osc comparator;

a fourth osc switch, having a first terminal supplied with a low threshold voltage and a second terminal connected to said negative input of said osc comparator; and an osc inverter, having an input connected to an output of said osc comparator for producing an inverse oscillation signal, wherein said oscillation signal turns on/off said second osc switch and said fourth osc switch, and wherein said inverse oscillation signal turns on/off said first osc switch and said third osc switch.

16. The close-loop PWM controller as claimed in claim 10, wherein said current-waveform detector comprises:

a peak detector, for generating a peak-current signal by sampling a peak value of said primary-side switching current signal;

a third capacitor, for holding said peak-current signal;

a second output capacitor, for generating said current-waveform signal; and a switch, for conducting said peak-current signal to said second output capacitor, wherein said switch is turned on/off by said oscillation signal.

17. The close-loop PWM controller as claimed in claim 10, wherein said integrator comprises:

a second V-to-I converter, formed by a timing operational amplifier, a timing resistor and timing transistors, wherein said second V-to-I converter generates a programmable charge current in response to said current-waveform signal;

a timing capacitor, for producing an integrated signal;

a first switch, wherein a first terminal of said first switch is supplied with said programmable charge current and a second terminal of said first switch is connected to said timing capacitor, and wherein said discharge-time signal turns on/off said first switch;

a second switch, connected in parallel with said timing capacitor for discharging said timing capacitor;

a third output capacitor, for producing said current-feedback signal; and a third switch, for conducting said integrated signal to said third output capacitor.

18. The close-loop PWM controller as claimed in claim 10, wherein said PWM circuit has a blanking circuit for ensuring a minimum on-time of said switching signal when said switching signal is enabled, which further ensures a minimum value of said discharge-time for multi-sampling said reflected voltage.

* * * * *